US012694567B2

(12) United States Patent
Funes Mora

(10) Patent No.: US 12,694,567 B2
(45) Date of Patent: Jul. 28, 2026

(54) AUTOMATED CALIBRATION METHOD OF A SYSTEM COMPRISING AN EXTERNAL EYE-TRACKING DEVICE AND A COMPUTING DEVICE

(71) Applicant: Eyeware Tech SA, Martigny (CH)

(72) Inventor: Kenneth Alberto Funes Mora, Lausanne (CH)

(73) Assignee: Eyeware Tech SA, Martigny (CH)

( * ) Notice: Subject to any disclaimer, the term of this patent is extended or adjusted under 35 U.S.C. 154(b) by 530 days.

(21) Appl. No.: 18/033,300

(22) PCT Filed: Oct. 12, 2021

(86) PCT No.: PCT/IB2021/059318
§ 371 (c)(1),
(2) Date: Apr. 21, 2023

(87) PCT Pub. No.: WO2022/084803
PCT Pub. Date: Apr. 28, 2022

(65) Prior Publication Data
US 2024/0013439 A1 Jan. 11, 2024

(30) Foreign Application Priority Data
Oct. 23, 2020 (CH) ...................................... 1361/20

(51) Int. Cl.
*G06T 7/80* (2017.01)
*G06T 7/246* (2017.01)
(Continued)

(52) U.S. Cl.
CPC ................ *G06T 7/85* (2017.01); *G06T 7/248* (2017.01); *G06T 7/285* (2017.01); *H04N 17/002* (2013.01);
(Continued)

(58) Field of Classification Search
CPC ........... G06T 7/85; G06T 7/248; G06T 7/285; G06T 2200/24; G06T 2207/10012;
(Continued)

(56) References Cited

U.S. PATENT DOCUMENTS 10,902,628 B1 * 1/2021 Kharboutly ............ G06V 40/18
2011/0063403 A1 3/2011 Zhang et al.
(Continued)

FOREIGN PATENT DOCUMENTS

WO WO-2014/146199 A1 9/2014
WO WO-2015/192879 A1 12/2015
(Continued)

OTHER PUBLICATIONS

Zhang, Z. (1999). A Flexible New Technique for Camera Calibration A Flexible New Technique for Camera Calibration. 10. https://www.microsoft.com/en-us/research/wp-content/uploads/2016/02/tr98-71.pdf (Year: 1999).*
(Continued)

*Primary Examiner* — Gregory A Morse
*Assistant Examiner* — David Alexander Wambst
(74) *Attorney, Agent, or Firm* — BLANK ROME LLP

(57) ABSTRACT

The present invention relates to a method for calibrating a system (10) comprising an external eye-tracking device (16) and a computing device (12a; 12b) and for capturing the gaze of a user (P) on the screen (13) of the computing device in real-time. The calibration of the system (10) comprises: capturing with one or more cameras (17, 18) of the eye-tracking device (16) at least of one image of landmarks (f1, f2, f3 . . . fn) of the face of the user (P) to identify the 3D position of each landmark in the coordinate system (ECS) of said eye tracking device; capturing with a camera (15) of the computing device (12a; 12b) the same landmarks (F1, F2, F3) of the face of the user (P) in the image coordinate system
(Continued)

(ICS) of the computing device camera (15) to identify the 2D position of each landmark in the image coordinate system ICS; computing the 3D pose of the camera (15) of the computing device (12a, 12b), defined as the camera coordinate system (CCS), as a function of the 3D position and 2D position of each landmark (f1, f2, f3 . . . fn) respectively in the coordinate system ECS and in the coordinate system ICS, and computing the 3D pose of the screen of the computing device, defined as the screen coordinate system (SCS), as a function of the camera coordinate system and mechanical parameters describing how the screen (13) is positioned with respect to the camera (15) of the computing device. Capturing the gaze of a user (P) on the screen (13) of the computing device in real-time comprises: retrieving a gaze ray (d) of the user (P) with the eye-tracking device (16), and intersecting the gaze ray (d) of the user (P) with the plane of the screen of the computing device, as a function of the ECS and SCS parameters, to capture the gaze-on-screen in real-time.

19 Claims, 3 Drawing Sheets

(51) Int. Cl.
  *G06T 7/285*  (2017.01)
  *H04N 17/00*  (2006.01)

(52) U.S. Cl.
  CPC ............................... *G06T 2200/24* (2013.01); *G06T 2207/10012* (2013.01); *G06T 2207/30201* (2013.01); *G06T 2207/30204* (2013.01); *G06T 2207/30244* (2013.01)

(58) Field of Classification Search
  CPC . G06T 2207/30201; G06T 2207/30204; G06T 2207/30244; G06T 7/70; H04N 17/002; G06V 40/171; G06V 40/18
  See application file for complete search history.

(56)     References Cited

U.S. PATENT DOCUMENTS

| | | | | |
|---|---|---|---|---|
| 2016/0202756 A1* | 7/2016 | Wu | ........................ | G06F 3/0304 382/103 |
| 2019/0259174 A1* | 8/2019 | De Villers-Sidani | ........................ | G06V 40/171 |
| 2020/0089315 A1* | 3/2020 | Stent | ........................ | H04N 23/11 |
| 2020/0174560 A1 | 6/2020 | Park et al. | | |

FOREIGN PATENT DOCUMENTS

| | | |
|---|---|---|
| WO | WO-2020/044180 A2 | 3/2020 |
| WO | WO-2020/208494 A1 | 10/2020 |

OTHER PUBLICATIONS

Sromek, D. (Aug. 9, 2020). How to get accurate results? Realeye.io. https://web.archive.org/web/20200809052809/https://support.realeye.io/how-to-get-accurate-results/ (Year: 2020).*

RealEye. (Oct. 5, 2020). RealEye.io—Basic instructions for participants. YouTube. https://www.youtube.com/watch?v=PJ-KKyFxG_4 (Year: 2020).*

Lanata, A., Valenza, G., Greco, A., & Scilingo, E. P. (2015). Robust Head Mounted Wearable Eye Tracking System for Dynamical Calibration. Journal of Eye Movement Research, 8(5). https://doi.org/10.16910/jemr.8.5.2 (Year: 2015).*

Hu, Masa, et al. "Camera Self-Calibration Using Human Faces." 2023 IEEE 17th International Conference on Automatic Face and Gesture Recognition (FG), Jan. 5, 2023, pp. 1-8, ieeexplore.ieee.org/document/10042701, https://doi.org/10.1109/fg57933.2023.10042701 (Year: 2023).*

International Search Report and Written Opinion for PCT/IB2021/059318, dated Jan. 12, 2022, 11 pgs.

Panev, et al., "Improved Multi-Camera 3D Eye Tracking for Human-Computer Interface", The 8th IEEE International Conference on Intelligent Data Acquisition and Advanced Computing Systems: Technology and Applications, Sep. 2015, 6 pgs.

Li, et al., "Real-Time Gaze Estimation Using a Kinect and a HD Webcam", MMM, Part I, LNCS 8325, 2014, pp. 506-517.

Nitschke, et al., "Eye Reflection Analysis and Application to Display-Camera Calibration", Nov. 7, 2009, IEEE, 4 pgs.

* cited by examiner

AUTOMATED CALIBRATION METHOD OF A SYSTEM COMPRISING AN EXTERNAL EYE-TRACKING DEVICE AND A COMPUTING DEVICE

The present application is a national stage of International Application No. PCT/IB2021/059318, filed on Oct. 12, 2021, which claims priority to CH01361/20, filed Oct. 23, 2020. The entire disclosure of these applications is hereby incorporated by reference.

FIELD OF THE INVENTION

The present invention relates to a method for automated calibration between an eye-tracking device and a computing device with a camera. This method enables to capture the gaze of a user on the screen of the computing device in real-time irrespective of the position of the eye-tracking device with respect to the computing device.

DESCRIPTION OF RELATED ART

Eye tracking has been solved by making use of multiple strategies. An eye tracking setup is generally composed of one or multiple cameras that capture the face and/or eyes and, in most common applications, with one or multiple screen such as a laptop screen or desktop screen. Most systems require to know what the positioning of the physical screens is with respect to the eye-tracking device configured to track the movement of the eyes of a user.

This can be problematic because the screens themselves are not in the field of view of the one or more cameras, making it difficult to infer automatically where the screens are with respect to the cameras. To solve this problem, commercial eye tracking solutions introduce UI/UX strategies that guide the user on how exactly to mount the eye-tracking device on each of the screens. Some systems even use one eye-tracking device per screen.

The above solutions are tedious procedure to put in place which require complicated setups of an eye-tracking device with respect to the screen of the computing device, in particular, when a freely positioning of the eye-tracking device is desirable.

There is therefore a need for automated calibration of the eye-tracking device with respect to the screen of the computing device.

Automated calibration methods between an eye-tracking device and a camera already exist.

For example, US 2020174560 discloses a calibration method for a three-dimensional augmented reality and apparatus thereof. The calibration method includes determining a first conversion parameter representing a relationship between a coordinate system of an eye-tracking camera and a coordinate system of a calibration camera by capturing a physical pattern using the eye-tracking camera and the calibration camera, and determining a second conversion parameter representing a relationship between a coordinate system of a virtual screen and the coordinate system of the calibration camera and a size parameter representing a size of the virtual screen by capturing a virtual pattern displayed on the virtual screen using the calibration camera.

The method according to US2020174560 therefore enables to accurately display a virtual object on a virtual screen at a point corresponding to a target position which intersects the gaze ray of the user tracked by the eye-tracking camera.

BRIEF SUMMARY OF THE INVENTION

An aim of the present invention is to provide a new method for capturing by an eye-tracking device the gaze of a user on the screen of the computing device irrespective of the position of the eye-tracking device with respect to the computing device.

Another aim of the present invention is to provide a method for a quick setup and an automated calibration of a system comprising an eye-tracking device and a computing device.

A further aim of the present invention is to provide a method for automatically recalibrating the system when the eye-tracking device has been moved with respect to the computing device and/or when the screen of the computing device has been moved.

According to the invention, these aims are achieved by means of a method for calibrating a system comprising an external eye-tracking device and a computing device and for capturing the gaze of a user on the screen of the computing device in real-time. The calibration of the system comprises: capturing with one or more cameras of the eye-tracking device at least of one image of landmarks of the face of the user to identify the 3D position of each landmark in the coordinate system (ECS) of said eye tracking device; capturing with a camera of the computing device the same landmarks of the face of the user in the image coordinate system (ICS) of the computing device camera to identify the 2D position of each landmark in the image coordinate system ICS; computing the 3D pose of the camera of the computing device, defined as the camera coordinate system (CCS), as a function of the 3D position and 2D position of each landmark respectively in the coordinate system ECS and in the coordinate system ICS, and computing the 3D pose of the screen of the computing device, defined as the screen coordinate system (SCS), as a function of the camera coordinate system and mechanical parameters describing how the screen is positioned with respect to the camera of the computing device. Capturing the gaze of a user on the screen of the computing device in real-time comprises: retrieving a gaze ray of the user with the eye-tracking device, and intersecting the gaze ray of the user with the plane of the screen of the computing device, as a function of the ECS and SCS parameters, to capture the gaze-on-screen in real-time.

In an embodiment, the gaze ray is retrieved within a time frame that is the same, different or overlapping a time frame during which the calibration of the system is performed.

In an embodiment, the 3D position and 2D position of each landmark, respectively in the coordinate system ECS and in the coordinate system ICS, collected over a set of image frames, are further used to compute the computing device camera intrinsic parameters, such as the focal length, principal point, and lens distortion parameters, by minimizing the reprojection error between 2D landmarks positions and the 2D projection of the 3D landmarks into the ICS as function of said intrinsic parameters.

In an embodiment, the step of determining the mechanical parameters describing how the screen is positioned with respect to the camera of the computing device uses a User Interface (UI) which prompts the user to indicate the position of said camera with respect to the screen of the computing device.

In an embodiment the step of determining the mechanical parameters describing how the screen is positioned with respect to the camera of the computing device comprises retrieving, from a database comprising existing computing devices in the market, information on the location of the camera with respect to its screen to a specific computing device.

In an embodiment the eye-tracking device and the computing device are assumed to be temporally stationary to compute the 3D pose of the screen of the computing device defined as the SCS through a frame-batch calibration by aggregating information from multiple temporal frames such that:

the 3D position and 2D position of each landmark, respectively in the coordinate system ECS and in the coordinate system ICS, are collected over said set of frames:

the 3D pose of the screen (SCS) is computed either through a batch optimization process, or by computing the 3D pose of the screen (SCS) separately for every frame and then averaging the frame-wise SCS to compute the output SCS.

In an embodiment, a frame-batch calibration is conducted as a one-time calibration, in which the calibration parameters are fixed and reused without further adaptations when intersecting the gaze ray (d) of the user (P) with the plane of the screen of the computing device, as a function of the ECS and SCS parameters.

In an embodiment the eye tracking device comprising an Inertial Measurement Unit (IMU). The calibration of the system is run again when the IMU detects movements of the eye tracking device in order to recalibrate the system with the new position of the eye tracking device once it remains stationary for a given period of time.

In an embodiment, the calibration of the system is run again when the background has moved from the field of view of the camera of the computing device or the camera of the eye tracking device, using background features tracking techniques.

In an embodiment, the method further uses a UI for guiding the user for the calibration of the system. The UI is configured to:

instruct the user to position the eye tracking device in a place in which it will remain stationary, automatically collect said landmarks at different time intervals optionally instruct the user to move in a preferred manner, and optionally instruct the user to click on "next" once said landmarks have been collected in order to trigger an optimization process in which the final pose of the eye tracking device with respect to the screen is computed.

In an embodiment, samples of landmarks of the user are continuously been collected by the one or more cameras of the eye tracking device. The 3D pose of the camera of the computing device with respect to the 3D pose of the eye tracking device is iteratively computed with the last N frames at different time intervals in order to capture the gaze-on-screen in real-time irrespective of the position of the eye-tracking device with respect to the computing device while the face of the user is in the field of view of both the eye tracking device and the camera of the computing device.

In an embodiment the eye-tracking device comprises a depth-sensing camera to identify the 3D position of each landmark in the coordinate system ECS.

In an embodiment the eye-tracking device comprises a multi-camera. The 3D position of each landmark in the coordinate system ECS is calculated using a stereo triangulation computer vision technique.

In an embodiment the eye-tracking device comprises a 3D representation of a person's facial shape which is used to identify the 3D position of each landmark in the coordinate system ECS or CCS.

In an embodiment, the landmarks are facial features of the user corresponding to facial points such as eye corners, mouth corners and nose tip.

In an embodiment, the landmarks comprise any point which can be detected in both the eye tracking device camera as well as the computing device camera, a priori. Candidate points may be defined from image processing techniques to establish interest points.

In an embodiment, the camera of the computing device is an in-built or external camera. A user interface displays visual markers on the screen that can be used as a visual guide to the user on how to mount the external camera on the screen at a desired position. Alternatively, the user may move such visual markers to feedback into the system where the camera has been placed or where the camera has been built into the computing device.

In an embodiment, the eye-tracking device is a mobile phone.

The present invention also relates a tangible computer product containing program code for causing a processor to execute the method as described above when said code is executed on said processor.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figures 1, 2:
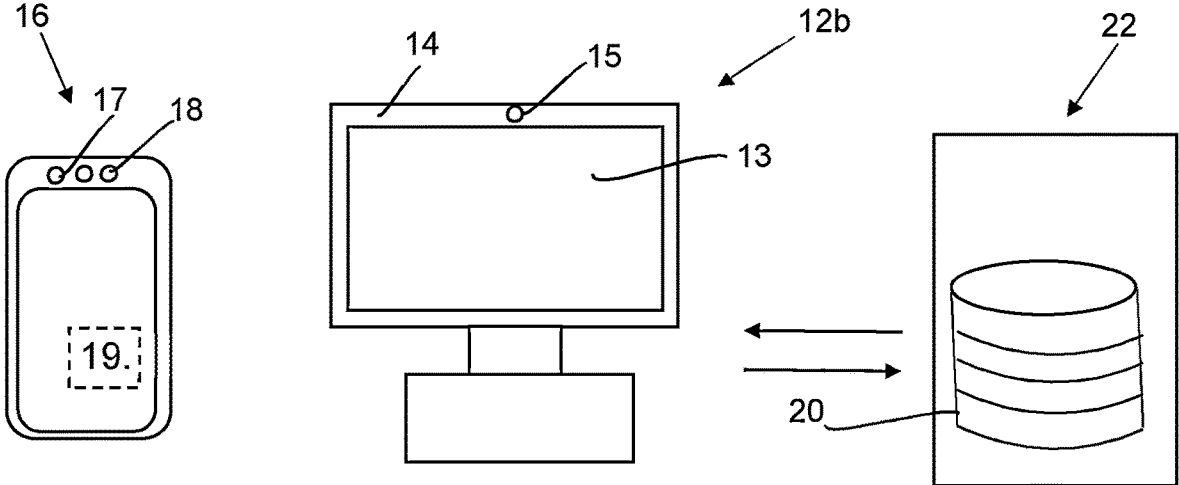
FIG. 1 shows a schematic view of a system comprising a laptop computer and a mobile phone as an eye-tracking device according to an embodiment of the present invention.
FIG. 2 shows a schematic view of a system comprising a desktop computer, a mobile phone as an eye-tracking device and a remote server in communication with the desktop computer.

FIGS. 1 and 2 schematically show an example of a system 10 comprising a computing device 12a, 12b and an eye-tracking device 16. The computing device may be for example a laptop computer 12a, a desktop computer 12b, or a tablet computer (not shown). The computing device comprises a built-in 2D camera 15 or, as an alternative, an external 2D camera (not shown) which can be positioned on the borders 14 of the screen 13 of a desktop computer 12b in an unambiguous manner such as a specific model with a specific mount with indications on its placement with respect to the screen of the computing device.

The tracking device 16 is preferably a mobile device such as a smartphone. In a preferred embodiment the smartphone 16 comprises an RGB camera 17 as well as a depth-sensing camera 18 such as the TrueDepth® camera of the IPhone®. In another embodiment, the device comprises one or multiple infrared cameras as an alternative or complementary to the RGB camera. Such infrared data may also be the amplitude data from time-of-flight sensors. In another non-illustrated embodiment, the mobile device 16 may comprise a dual or multiple camera, without any depth-sensing camera, that can together work as a depth sensor through stereo triangulation. Cameras of one or different types could indeed be mixed. The resolution, type and focal of different cameras may vary.

For the automated calibration between the eye tracking device 16 and the computing device 12a, 12b to enable to capture the gaze of a user P on the screen 13 of the computing device in real-time irrespective of the position of the eye tracking device 16 with respect to the computing device, the face of the user P must stand at the same time in the field of view of both the depth-sensing camera 18 of the Smartphone 16 and of the built-in camera 15 in the borders 14 of the laptop computer 12a according to an embodiment as shown in FIG. 1.

Figure 3:
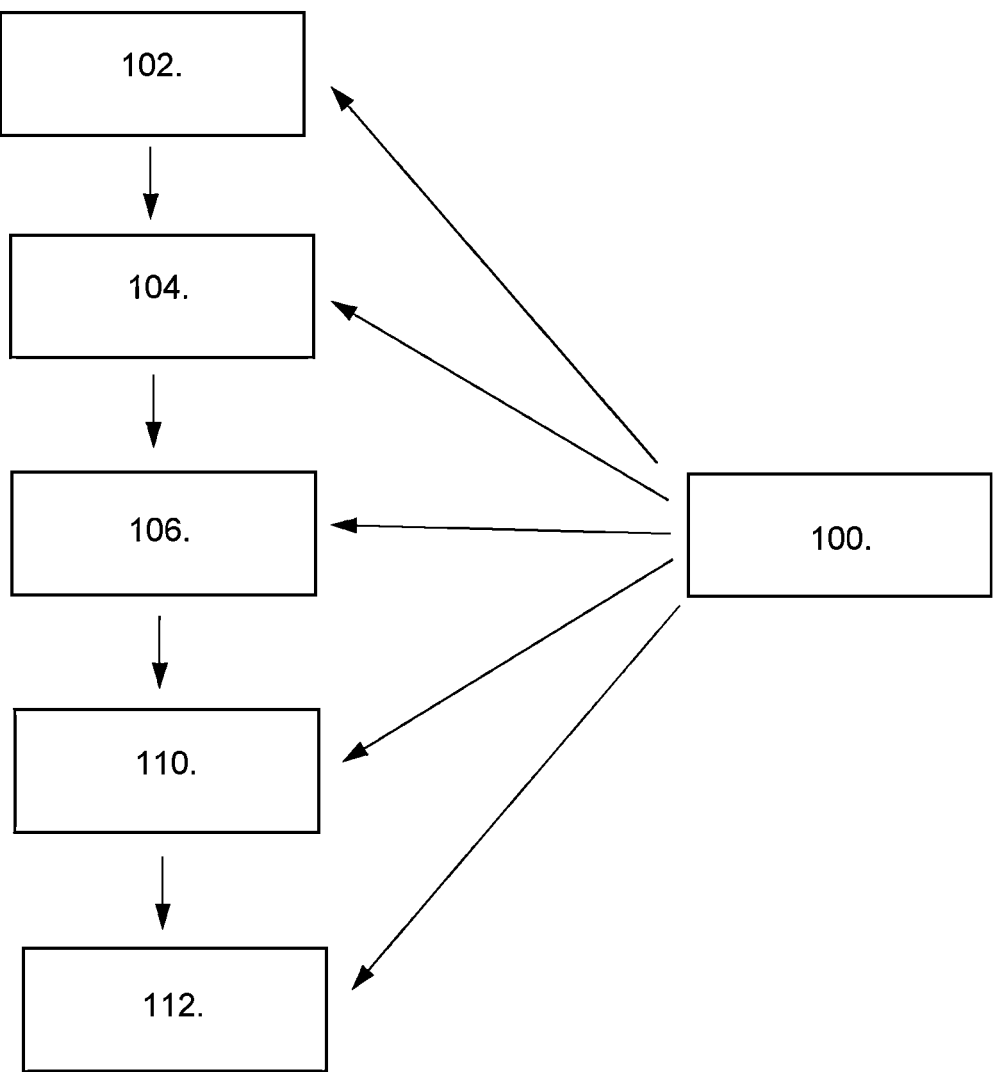
FIG. 3 is a flowchart that illustrates the steps of capturing the gaze of the user on the screen of the computing device in real-time according to an embodiment of the present invention.
Figure 4:
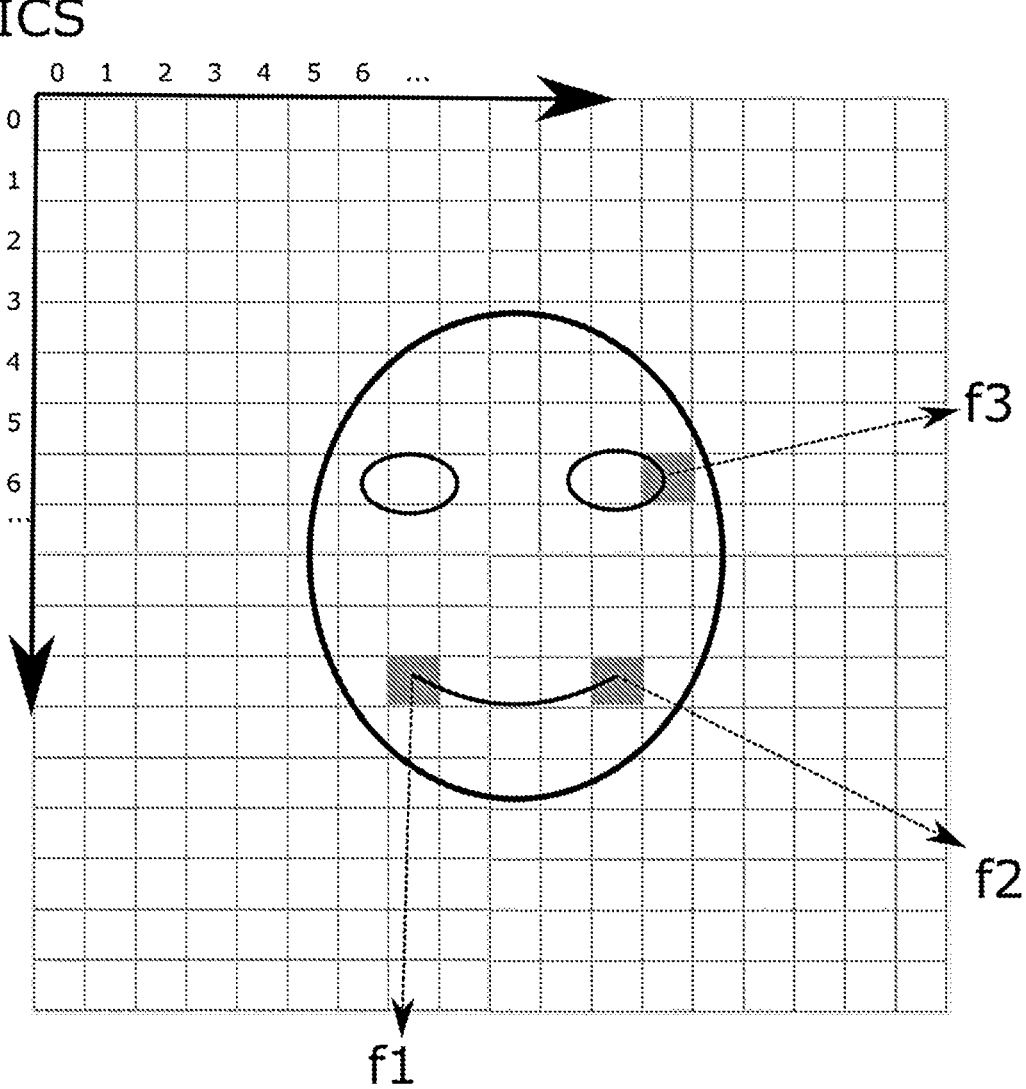
FIG. 4 shows a schematic view of the landmarks coordinates as captured by the camera of the computing device represented in the image coordinate system.

FIG. 3 is a flowchart that illustrates the different steps for capturing the gaze of the user on the screen 13 of the computing device 12a, 12b in real-time irrespective of the position of the eye-tracking device 16 with respect to the computing device according to an embodiment of the present invention in the assumption that the face of the user P is constantly in the field of view of both the eye-tracking device 16 and of the camera 15 of the computing device.

During step 100, the gaze ray d of the user P is retrieved by the eye-tracking device 16. The gaze estimation of the user may be obtained by different methods. For example, the gaze of the user may be acquired by retrieving an input image and a reference image of an eye of the user and processing the input image and the reference image to estimate a gaze difference between the gaze of the eye within the input image and the gaze of the eye within the reference image. The gaze of the user is the retrieved using the estimated gaze difference and the known gaze of the reference image. This procedure is disclosed in detail in WO2020/044180, the content of which is hereby incorporated by reference. In another example, the gaze of the user may be acquired by comparing an image geometric model with at least one image segmentation map generated from one input image observation corresponding to an image of the user's eye and iteratively modifying at least one parameter in the set of geometric parameters of the image geometric model to generate a new image geometric model of a user's eye until a model correspondence value reaches the optimal value. This procedure is disclosed in detail in WO2020/208494, the content of which is hereby incorporated by reference. Other methods for gaze estimation are disclosed in detail for example in WO2014/146199 and WO2015/192879.

It should be noted that the gaze ray d of the user may be constantly tracked by the eye-tracking 16 while steps 102 to 112 described below are performed. Step 100 may therefore not performed only at the beginning of the calibration procedure but also through steps 102 to 112 of the procedure to capture the gaze-on-screen in real-time. The gaze ray may however be tracked only when the calibration procedure is completed according to a variant.

During step 102, the eye tracking device 16 identifies facial features f1, f2, f3, . . . , fn of the user P measured on the video stream captured by both the RGB camera 17 and the depth-sensing camera 18 of the Smartphone 14. The facial features f1, f2, f3, . . . , fn may be for example pixel coordinates of the eye corners, mouth corners, nose tip, etc. Arbitrary points may also be used as long as their corresponding point can be detected in the video stream captured by the camera 15 of the computing device 12a, 12b. For example, SIFT, SURF, LBP, or any other type of local features descriptor may be used to establish pairwise correspondences. Pairwise correspondences may then be established through local features comparisons, machine learning techniques, or computer vision algorithms such as the Kanade-Lucas-Tomasi tracking, for example, available in the OpenCV library.

The identification of facial features, in particular those corresponding to semantic locations on the face such as mouth or eye corners, can be done using multiple strategies. In one embodiment, a deep neural network can be used for face detection and for detecting the 2D location of each those landmarks, in the form of a response map which is an image in which each pixels gets assigned a score of how likely it is for a particular landmark type to be located.

Another approach may use regression techniques to identify the landmark positions based on face images. These facial features f1, f2, f3 . . . , fn of any other landmarks can be computed in 3D in the coordinate system ECS of the eye-tracking device, i.e. for each facial feature point or landmark point recognized on the face of the user P, its 3D position is known with respect to the coordinate system ECS by using the depth-sensing camera 18 of the Smartphone. Similar strategies can be applied to the camera 15 of the computing device, although in a preferred embodiment, only a 2D detection of the landmarks is necessary for the camera 15. As mentioned earlier, the gaze ray d of the user P may constantly tracked by the eye-tracking device 16 while the latter simultaneously identifies facial features f1, f2, f3, . . . fn of the user P to identify the 3D position of each facial features f1, f2, f3, . . . , fn of any other landmarks in the coordinate system ECS.

Alternative strategies may utilize a 3D representation of a face shape which is constructed either offline or online, for example, through 3D reconstruction strategies, 3D morphable models, average population shapes, etc. Under such conditions, the 3D position of facial landmarks can be retrieved by first identifying said landmarks in 2D, for example, in the eye-tracking device camera, and then using approaches such as point-n-perspective provided that the eye-tracking device camera is calibrated in terms of its camera intrinsic parameters (focal length, principal point, lens distortion, skew, etc.). The eye-tracking device 16 would be able to deliver the 3D location of the landmarks in the coordinate system ECS with this technique without having to use a depth-sensing camera, although this technique can also be combined with depth information to retrieve a more accurate estimate of the 3D landmarks position.

The identification of facial features f1, f2, f3, . . . , fn can also be supported by a 3D face and head tracking system, in which temporal information and other data such as appearance representations, depth-shape matching, etc are integrated into the frame-by-frame identification.

Because of the knowledge of the 3D head pose as well as the 3D model of the facial shape, the landmarks positions can be computed in 3D in the coordinate system ECS.

In an alternative embodiment according to which no depth-sensing camera equipped the eye-tracking device 16, a stereo camera, or dual camera, or multi camera is integrated in the eye-tracking device to capture at least two video streams from their respective distinct points of view. The facial features f1, f2, f3, . . . , fn of any other landmarks of the user P are then computed using stereo triangulation computer vision techniques well-known from a skilled person the field of computer vision.

During step 104, the camera 15 of the computing device 12*a*, 12*b* is used, in parallel, to identify the same facial features f1, f2, f3, . . . , fn or arbitrary landmarks of the user P identified by the eye-tracking device 16 but from the point of view of the camera 15 of the computing device. These facial features f1, f2, f3, . . . , fn or arbitrary landmarks may only be identified in 2D due to the limitations of the computing device camera 15 which usually capture video streams in 2D. Therefore, 3D position of each of these facial features cannot be directly extrapolated in the coordinate system CCS.

During step 106, the coordinate system CCS, i.e. the 3D pose of the camera 15 of the computing device 12*a*, 12*b*, is computed using different algorithms, such as perspective-n-point (PnP) as follows: by creating landmarks correspondence pairs of 3D points in the ECS as well as 2D points in the ICS, the camera pose may be determined by minimizing the image position difference between the 2D landmarks identified in the ICS and the 3D landmarks identified in the ECS projected into 2D in the ICS (assuming a pin-hole camera model), whereas the projection is a function of said camera pose to be optimized for. This difference is known as the reprojection error. There are multiple open source implementations of the PnP algorithm, notably in the OpenCV library.

Some further considerations need to be made on top of the PnP algorithm solution: the PnP algorithm effectively estimates the 3D pose of a "3D object" with respect to the 3D camera coordinate system for the camera which generated the image in which the 2D points are defined. By formulating the problem in a way in which the 3D ECS points are used directly as the "3D object" for the PnP algorithm, in combination with the 2D ICS points, the outcome is therefore the relative pose of the ECS with respect to the CCS. To determine the -absolute- pose of the CCS, the inverse rigid transform is then computed to find instead the pose of the CCS relative to the ECS, and then compose with the ECS itself to find the absolute pose of the CCS.

Assuming the eye-tracking device 16 is stationary with respect to the computing device 12*a*, 12*b*, 3D ECS to 2D ICS point correspondences can be aggregated from multiple time frames. This may lead to more numerically robust estimates of the CCS. Alternatively, one can compute the CCS for each individual timeframe and then average the results into a single CCS estimate.

To establish the 3D to 2D projection of landmarks into the camera of the computing device 12*a*. 12*b*, assumption is made on a camera pin-hole model representation which fully defines the 3D geometry equations to project 3D points into the camera image plane. Nevertheless, the camera intrinsic parameters are required in order to make such projection. These comprise the focal length, principal point, skew, lens distortion parameters, etc.

Ideally, the camera calibration parameters would be known by the system. However, in most consumer devices such as laptops, the parameters of its webcam are unavailable to the operating system or they might be completely unknown. In an embodiment, these parameters can nevertheless be computed as part of its algorithm as follows: a set of correspondences of 3D landmarks f1, f2, f3, . . . , fn in the ECS and the same 2D landmarks f1, f2, f3, . . . , fn in the ICS, can be established. By accumulating correspondence pairs over one to multiple frames, we can use a camera calibration algorithm which minimizes the reprojection error, solving the optimization problem not only for the object pose, but also optimizing for the camera intrinsic parameters. These are techniques available in open source systems, such as the OpenCV library.

In an embodiment, the reprojection error minimization can be used to both estimate the camera pose, as well as the camera intrinsic parameters in parallel.

In an embodiment, the camera calibration process can be done early in the lifetime of using the software and the parameters can be stored in a file and retrieved when needed for later use as camera intrinsic parameters can be assumed to be stable over long periods of time. At this point, the pose of the depth-sensing camera 18 of the eye tracking device 16 with respect to the pose of the computing device camera 15 is known but the pose of the screen 13 of the computing device 12*a*, 12*b* with respect to depth-sensing camera 18 of the eye tracking device 16 is not yet known.

During step 108, the 3D pose of the camera 15 of the computing device 12*a*, 12*b* with respect to its screen 13 is determined. This can be done for example through UX/UI program run by the computing device 12*a*, 12*b* and configured to instruct the user to indicate where the computing device camera 15 is positioned with respect to its screen 13. For example, for external camera, the user may need to indicate whether the camera is positioned at the top or at the bottom of the screen, at which distance from the screen border, the size of the screen (eg. 15" or 17"), the orientation of the camera (pan, tilt, and yaw angles), the screen position over the screen plane, or its horizontal translation from the screen middle line and/or the curvature of the screen. If the camera is a built-in camera, a few assumptions can be made in terms of camera placement. For example, the camera horizontal position can be assumed to be exactly aligned to the centre of the screen, or that the camera pan, tilt and roll angles are zero. In case the camera is integrated in one of the folds of a foldable screen, the second (or third) fold's pose may be known for example from the hinge angle known by the software. These parameters, especially in systems in which the camera of the computing device is built-into the device, will be herein referred to as the mechanical parameters describing how the screen is positioned with respect to the camera.

In another embodiment, in which the camera is not in-built into the computing device, the UI may display visual markers on the screen that can be used as a visual guide to the user on how to mount an external camera on the screen at a desired position. Alternatively, the user may move such visual markers to feedback into the system where the camera has been placed.

In another embodiment, in which the camera is built-in into the computing device but having an uncommon placement (eg. not on the centre of the screen), the UI may also display visual markers that the user may move to feedback into the system where the camera is located.

In another embodiment, the computing device 12*a*, 12*b* may retrieve, from a database 20 comprising existing computing devices in the market, information about a specific model of a computing device regarding for example the location of the camera 15 with respect to its screen 13 (e.g. whether the camera is positioned at the top, the bottom or either side of the screen), the distance of the centre of the camera 15 from the screen 13 and/or the size of the screen 13 (e.g. 15 inches or 17 inches).

Other information on the camera parameter such as its focal length, its principal point and/or its lens distortion for a specific model may also be retrieved from the database 20. The database may be stored on the computing device 12*a*, 12*b* or may be accessed from a remote sever 22 as shown in FIG. 2.

A UI for calibration of the system 10 may be used. The UI is configured to prompt the user to perform the following steps:

connect the eye-tracking device 16 to the computing device 12a, 12b for example by plugging it into a USB port, or over Wi-Fi, Bluetooth®, etc.

position the eye-tracking device 16 in a place where it will remain stationary with respect to the screen 13 of the computing device 12a, 12b, for example in a stand 22 that may rest on a desk or which can be attached to the border 14 of the screen 13 of the computing device, and give permission to open the computing device camera 15 in order to automatically collect facial features f1, f2, f3, . . . , fn of the user P at different time intervals.

The UI may optionally ask the user to get himself/herself in the field of view of both the depth-sensing camera 18 of the eye-tracking device 16 and of the computing device camera 15 and to perform certain actions such as moving the face from side to side during which the system 10 may be collecting examples of landmarks positions.

The user may then be informed that the calibration of the position of the eye-tracking device 16 has been completed and may be asked to confirm for example by clicking on "next" to launch the final optimization process in which the pose of the eye-tracking device with respect to the computer screen is computed as described later on. The system may have conducted optimizations prior to the final optimization process, in order to evaluate whether more data is needed, or as a mechanism to provide a pleasant user experience in which eye tracking is functional even before the "next" event is executed.

The eye-tracking device 16 may comprise an Inertial Measurement Unit (UMI) 19 to detect unintentional or intentional movements of the eye-tracking device 16 with respect to the screen 13 of the computing device 12a, 12b. Upon detection of movements of the eye-tracking device 16 by the UMI 19, the calibration of the system 10 is run again with the new position of the eye tracking device 16 once it remains stationary for a given period of time, for example between one and five seconds. The calibration of the system 10 may also be run again when movements of background from the field of view of the camera 15 of the computing device have been detected using background detection techniques well-known from a skilled person in the field of computer vision, such as background subtraction technique.

Instead of performing a calibration of the system 10 and recalibrating the system only when the eye-tracking device 16 has been moved with respect to the screen 13 of the computing device 12a, 12b and/or the screen has been moved with respect to its support as described above, the system may be continuously collecting samples of facial features f1, f2, f3, . . . , fn of the user P and computing the pose of the camera with last N frames at several time intervals. This approach advantageously recalibrates constantly and automatically the system 10 to random replacements of the eye-tracking device 12 and/or movement of the screen for example of a laptop through its hinges.

During step 110, the gaze ray d of the user P is intersected with the plane of the screen of the computing device, as a function of the ECS and SCS parameters. In an embodiment, the gaze ray may first be defined in the coordinate system ECS, then transformed into the coordinate system CCS, and subsequently into the coordinate system SCS. More particularly, the gaze estimate per eye can be represented as a 3D ray, which is in turn composed by a 3D point which is the origin $o=<o_x,o_y,o_z>$ and a 3D vector defining a direction $v=<v_x,v_y,v_z>$. A parametric representation of the gaze estimate is thus given by the following equation:

$$r=<o_x,o_y,o_z>+t<v_x,v_y,v_z>$$

where t is a free parameter which goes from 0 to infinite for gaze estimation applications.

The above equation can also be represented as follows: $r(t)=o+tv$ where the parameters in bold are 3D vectors and the parameter not in bold is a scalar.

The gaze ray d of the user P in the coordinate system ECS is transformed into the coordinate system CCS using a rigid transformation composed of a rotation matrix R (3×3) and a translation vector T (3×1). A rigid transformation of a ray transforming from a coordinate system A to a coordinate system B can be expressed as follows:

$$o_B=R \cdot o_A+T;$$

$$v_B=R \cdot v_A$$

where:

$$r_A(t)=o_A+tv_A, \text{ and;}$$

$r_B(t)=o_B+tv_B$ that is, the same ray but referred to the respective coordinate systems A or B.

Using the equations above, A and B can be replaced by any of the coordinate systems ECS, CCS, and SCS. Each conversion direction requires different rotation and translation matrices which are the relative transform between each pair of coordinate system. Furthermore, a transform is not bidirectional, as an inverse transform, e.g. transforming from coordinate system B to coordinate system A, requires a new rotation and translation matrices given by $R'=R^T$ and $T'=-R^T T$ Once the gaze ray d of the user P has been transformed into the coordinate system SCS, the intersection of the gaze ray d with the screen plane of the computing device 12a, 12b can be computed by using line-to-plane intersection technique during step 112. In the scenario depicted in FIG. 1, the screen plane lies within two of the SCS axis (e.g. x and y axis). The particular axes are dependent on the chosen convention. Assuming one of said axis is x, the line-to-plane intersection is simply finding t which solves for $0=o_x+t \cdot v_x$.

In another embodiment, the gaze ray may be kept defined in the coordinate system ECS, whereas the screen plane itself is transformed into the ECS as a function of the ECS and SCS parameters. This can be achieved by computing the -relative- transform of the SCS with respect to the ECS and by formulating the gaze ray to plane equations as finding the value of t which generates a point within the 3D plane.

Many permutations of order of transforms may indeed be done to capture the gaze-on-screen in other embodiments. For example, referring both the gaze ray (d) and the screen plane to the global reference, and computing the line-to-plane intersection in said reference The order of step 102 and step 104 of the calibration method may be arbitrary determined. For example, step 104 may be performed before step 102 or concurrently with step 102.

Parameters known in advance, for example knowing a priori the camera 15 characteristics, such as camera intrinsics, of the computing device 12a, 12b can advantageously accelerate the convergence of algorithms and to enable more challenging configurations. In such cases, as already described above a database 20 of devices, and their respective parameters could be stored either locally in the computing device 12a, 12b or in the eye-tracking device 16 or in a remote server 22.

Various modifications and variations to the described embodiments of the invention will be apparent to those skilled in the art without departing from the scope of the invention as defined in the appended claims. For example, the eye-tracking device may be a device other than a mobile phone such as a stand-alone eye-tracking device with its own processing unit and a communication protocol allowing to either share the landmarks points, or video data. Alternatively, the communication protocols are configured such that the camera feed of the computing device, as well as mechanical parameters of the screen and other needed information are sent over to the eye-tracking device, which internally makes the necessary calibration computations.

In addition, embodiments with a multi-screen setup comprising a primary screen as described above in relation to the eye-tracking device and a secondary screen can be implemented within the scope of the appended claims. Further knowledge about the pose between the secondary screen with respect to the camera of the primary screen would be required in order to capture the gaze-on-screen in real-time on the secondary screen.

The invention claimed is:

1. A method for calibrating a system comprising an external eye-tracking device and a computing device and for capturing the gaze of a user on the screen of the computing device in real-time, wherein the calibration of the system comprises: capturing with one or more cameras of the eye-tracking device at least one image of landmarks of a face of the user to identify the 3D position of each landmark in the coordinate system (ECS) of said eye tracking device; capturing with a camera of the computing device the same landmarks of the face of the user in the image coordinate system (ICS) of the computing device camera to identify the 2D position of each landmark in the ICS;

> computing the 3D pose of the camera of the computing device, defined as the camera coordinate system (CCS), as a function of the 3D position and 2D position of each landmark respectively in the ECS and in the ICS, and computing the 3D pose of the screen of the computing device, defined as the screen coordinate system (SCS), as a function of the CCS and mechanical parameters describing how the screen is positioned with respect to the camera of the computing device, and wherein capturing the gaze of a user on the screen of the computing device in real-time comprises retrieving a gaze ray of the user with the eye-tracking device, and intersecting the gaze ray of the user with the plane of the screen of the computing device, as a function of the ECS and SCS, to capture the gaze-on-screen in real-time.

2. The method of claim 1, wherein said gaze ray is retrieved within a time frame that is the same, different or overlapping a time frame during which the calibration of the system is performed.

3. The method of claim 1, wherein the 3D position and 2D position of each landmark, respectively in the coordinate system ECS and in the coordinate system ICS, collected over a set of image frames, are further used to compute the computing device camera intrinsic parameters, such as the focal length, principal point, and lens distortion parameters, by minimizing the reprojection error between 2D landmarks positions and the 2D projection of the 3D landmarks into the ICS as function of said intrinsic parameters.

4. The method of claim 1, wherein the step of determining the mechanical parameters describing how the screen is positioned with respect to the camera of the computing device uses a User Interface which prompts the user to indicate the position of said camera with respect to the screen of the computing device.

5. The method of claim 1, wherein the step of determining the mechanical parameters describing how the screen is positioned with respect to the camera of the computing device comprises retrieving, from a database comprising existing computing devices in the market, information on the location of the camera with respect to its screen to a specific computing device.

6. The method of claim 1, wherein the eye-tracking device and the computing device are assumed to be temporally stationary to compute the 3D pose of the screen of the computing device defined as the SCS through a frame-batch calibration by aggregating information from multiple temporal frames such that:

> the 3D position and 2D position of each landmark, respectively in the coordinate system ECS and in the coordinate system ICS, are collected over said set of frames:
> the 3D pose of the screen SCS is computed either through a batch optimization process, or by computing the 3D pose of the screen SCS separately for every frame and then averaging the frame-wise SCS to compute the output SCS.

7. The method of claim 1, wherein a frame-batch calibration is conducted as a one-time calibration, in which the calibration parameters are fixed and reused without further adaptations when intersecting the gaze ray of the user with the plane of the screen of the computing device, as a function of the ECS and SCS parameters.

8. The method of claim 1, the eye tracking device comprising an Inertial Measurement Unit (IMU), wherein the calibration of the system is run again when the IMU detects movements of the eye tracking device in order to recalibrate the system with the new position of the eye tracking device once it remains stationary for a given period of time.

9. The method of claim 1, wherein the calibration of the system is run again when the background has moved from the field of view of the camera of the computing device or the camera of the eye tracking device, using background features tracking techniques.

10. The method of claim 1, further using a UI for guiding the user for the calibration of the system, the UI being configured to:

> instruct the user to position the eye tracking device in a place in which it will remain stationary,
> automatically collect said landmarks at different time intervals
> optionally instruct the user to move in a preferred manner, and
> optionally instruct the user to click on "next" once said landmarks have been collected in order to trigger an optimization process in which the final pose of the eye tracking device with respect to the screen is computed.

11. The method of claim 1, wherein samples of landmarks of the user are continuously being collected by the one or more cameras of the eye tracking device, the 3D pose of the camera of the computing device with respect to the 3D pose of the eye tracking device being iteratively computed with the last N frames at different time intervals in order to capture said gaze-on-screen in real-time irrespective of the position of the eye-tracking device with respect to the computing device while the face of the user is in the field of view of both the eye tracking device and the camera of the computing device.

12. The method of claim 1, wherein the eye-tracking device comprises a depth-sensing camera to identify the 3D position of each landmark in the coordinate system ECS.

13. The method of claim 1, wherein the eye-tracking device comprises a multi camera, wherein the 3D position of each landmark in the coordinate system ECS is calculated using a stereo triangulation computer vision technique.

14. The method of claim 1, wherein the eye-tracking device comprises a 3D representation of a person's facial shape which can be used to identify the 3D position of each landmark in the coordinate system ECS or CCS.

15. The method of claim 1, wherein said landmarks are facial features of the user corresponding to facial points such as eye corners, mouth corners and nose tip.

16. The method of claim 1, wherein said landmarks comprise any point which can be detected in both the eye tracking device camera as well as the computing device camera, a priori, wherein candidate points are defined from image processing techniques to establish interest points.

17. The method of claim 1, the camera of the computing device being an in-built or external camera, wherein a user interface displays visual markers on the screen that can be used as a visual guide to the user on how to mount an external camera on the screen at a desired position, or wherein the user may move such visual markers to feedback into the system where the camera has been placed or where the camera has been built into the computing device.

18. The method of claim 1, wherein the eye-tracking device is a mobile phone.

19. A tangible computer product containing program code for causing a processor to execute the method of claim 1 when said code is executed on said processor.

* * * * *